(12) United States Patent
Teicher (10) Patent No.: US 8,249,988 B2
(45) Date of Patent: Aug. 21, 2012

(54) SYSTEM AND METHOD FOR VERIFYING PAYMENT

(75) Inventor: Mordechai Teicher, Hod-Hasharon (IL)

(73) Assignee: Sandisk IL Ltd., Kfar Saba (IL)

( * ) Notice: Subject to any disclaimer, the term of this patent is extended or adjusted under 35 U.S.C. 154(b) by 1707 days.

(21) Appl. No.: 10/989,330

(22) Filed: Nov. 17, 2004

(65) Prior Publication Data

US 2006/0015458 A1 Jan. 19, 2006

Related U.S. Application Data

(60) Provisional application No. 60/587,164, filed on Jul. 13, 2004.

(51) Int. Cl.
*G06Q 40/00* (2012.01)
(52) U.S. Cl. .............. 705/41; 705/40; 705/35
(58) Field of Classification Search .......... 705/35, 705/26, 39, 41, 40
See application file for complete search history.

(56) References Cited

U.S. PATENT DOCUMENTS

| | | | |
|---|---|---|---|
| 5,933,812 A * | 8/1999 | Meyer et al. ............ 705/15 |
| 5,955,961 A | 9/1999 | Wallerstein | |
| 6,065,675 A * | 5/2000 | Teicher ............ 235/380 |
| 6,257,487 B1 | 7/2001 | Hayashida | |
| 6,364,208 B1 * | 4/2002 | Stanford et al. ......... 235/492 |
| 6,488,204 B1 * | 12/2002 | Morooka et al. ......... 235/379 |
| 6,607,127 B2 | 8/2003 | Wong | |
| 6,636,833 B1 | 10/2003 | Flitcroft et al. | |
| 2001/0034717 A1 | 10/2001 | Whitworth | |
| 2001/0051917 A1 * | 12/2001 | Bissonette et al. ........ 705/39 |
| 2002/0074398 A1 | 6/2002 | Lancos et al. | |
| 2005/0165651 A1 * | 7/2005 | Mohan ............ 705/26 |

FOREIGN PATENT DOCUMENTS

WO   WO01/08111   2/2001

OTHER PUBLICATIONS

Quicken 2004 for Mac Manual 2003.*
International Search Report and Written Opinion for International Application No. PCT/IL05/00701, dated Apr. 25, 2007, 8 pages.

* cited by examiner

*Primary Examiner* — James Vezeris
(74) *Attorney, Agent, or Firm* — Toler Law Group, PC (57) ABSTRACT

A method, apparatus and system for verifying a charge payment transaction subsequent to executing the charge payment transaction in a retail location. The method includes moving a charge payment device into the retail location and presenting the charge payment device at a merchant point of sale located at the retail location for performing the charge payment transaction. A transaction record of the charge payment transaction is stored in a transaction log within the charge payment device. A report record of the charge payment transaction is transmitted from the merchant point of sale to a settlement system and added to an electronic payments report. The transaction log is electronically correlated with the electronic payments report, checking for discrepancies between the transaction log and the electronic payments report.

21 Claims, 5 Drawing Sheets

SYSTEM AND METHOD FOR VERIFYING PAYMENT

CROSS REFERENCE TO RELATED APPLICATIONS

This application claims the benefit of U.S. provisional application 60/587,164 filed 13 Jul. 2004 by the present inventor.

FIELD AND BACKGROUND OF THE INVENTION

The present invention relates to portable payment devices, and in particular to smart portable charge payment devices that store a record of recent payment transactions.

Charge cards of different kinds are commonly used for financial transactions. A credit card is a charge card that accumulates debt. The owner of a credit card is required to settle payment periodically. Debit cards are charge cards that promptly deduct payment from an account held by the cardholder. Most charge cards have a magnetic strip encoded with information identifying the credit or bank account associated with the charge card. Many charge cards are also embossed with the account identification data to allow its imprinting on paper forms.

With the advent of smart cards, a new type of charge card has emerged under a de-facto standard called EMV after Europay, MasterCard and Visa. A smart card, when used as a charge card, allows a smart card reader to authenticate the cardholder by presenting a personal identification number (PIN) or biometric signature. Methods for authenticating a smart card include data transfer using tamper resistant hardware and encrypted data transfer protocols. Some smart cards ("contact cards") use electrical contacts to interface with their compatible readers, while other smart cards ("contactless cards") use radio frequency (RF) for such interface. The latter case allows embedding charge card functionality within a variety of form factors in addition to the traditional plastic card, which include keyfobs, cellular telephones, watches, etc.

Card payment has become the target of a substantial amount of fraud. A cardholder is usually not liable for damages caused by fraud, either by agreement with the charge card issuer or by law. However, the cardholder is required to detect and identify fraudulent charges to his account. For this purpose, a statement is sent periodically to the card holder, detailing the transactions billed to his/her account, and the cardholder is required to check all transactions line by line and compare each transaction with receipts or records, if he/she keeps receipts or maintains records, and if not he/she is expected to detect and identify fraud based on memory or common sense.

Figure 1:
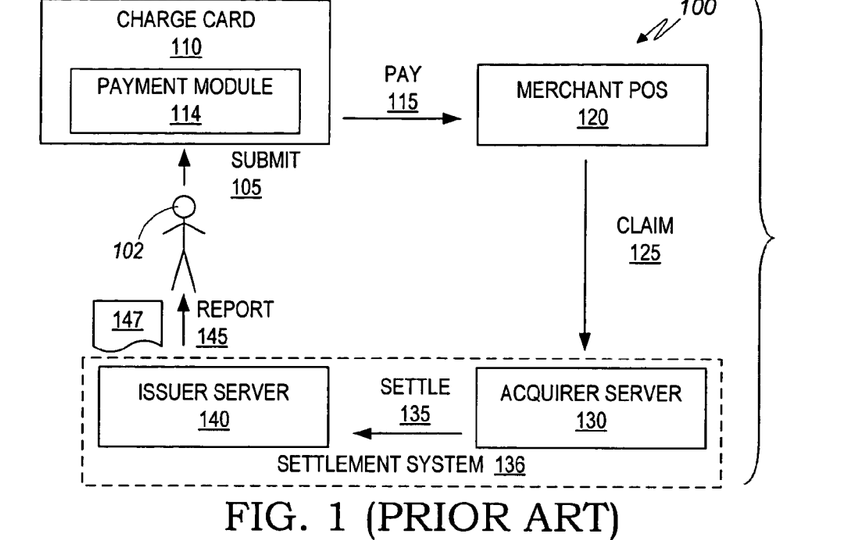
FIG. 1 is a simplified block diagram of a charge payment system of the prior art.

FIG. 1 (prior art) describes a common charge payment system 100. A cardholder 102 submits (step 105) a charge card 110 for payment (step 115). Card 110 includes a payment module 114, e.g. a magnetic strip or a smart chip, to identify the account and authorize payment from the account. Charge card 110 interfaces with a merchant point of sale (POS) 120. At merchant POS 120 the payment amount is entered manually by the merchant or received automatically from a scanner or from an automatic vending machine. Transaction details including account details, payment amount and time are sent (step 125) as a payment claim by merchant POS 120 to a merchants acquirer server 130. The claim is sent (step 135) from acquirer server 130 to an issuer server 140 of the card issuer of charge card 110. Receipt by issuer server 140 causes charging (not shown) the payment amount to the respective credit or bank account, and issuing (step 145) a report record 147 to the cardholder, usually as a line item in a monthly statement. Report record 147 typically includes the merchant identity, the purchase date and the payment amount. Cardholder 102 is then required to compare each report record 147 in his monthly statement to receipts, records and memorized events, in order to verify or dispute each line item.

Charge payment system 100 includes a settlement system 136 that includes acquirer server 130 operative to receive claims from merchants and issuer server 140 operative to collect money from cardholders and to issue monthly statements to the cardholders. Settlement system 136 is common for credit and debit cards issued by financial institutions. An alternative settlement system includes a single server that manages both the acquiring tasks (i.e. receiving claims from merchants) and issuing tasks (i.e. collecting money from cardholders and issuing monthly statement).

The more transactions one makes using the card, the more cumbersome, time consuming and prone to error does the review of the monthly statement become. Also, the associated need to keep receipts and records has become a hassle for many.

There is thus a need for and it would be highly advantageous to have a better way to compare between transactions made by the cardholder and transactions charged and reported to the cardholder by the issuer.

SUMMARY OF THE INVENTION

An object of the present invention is to simplify for the cardholder the increasingly difficult task of reviewing a periodic statement of transactions. Transactions are recorded on a charge payment device in a transaction log at the time transactions are made. The transaction log is compared to a periodic, e.g. monthly statement of transactions, i.e. electronic payments report. The cardholder is notified in a discrepancy report of any discrepancies found between the transaction log and the statement. The discrepancy report is shorter than the original statement and contains only the transactions that demand the attention of the cardholder, thus saving time but still allowing for the discovery of fraudulent transactions made to the respective account.

According to the present invention, there is provided a method for verifying a charge payment transaction subsequent to executing the charge payment transaction in a retail location, the method comprising (a) moving a charge payment device into the retail location; (b) presenting the charge payment device at a merchant point of sale located at the retail location for performing the charge payment transaction. A transaction record of the charge payment transaction is stored in a transaction log within the charge payment device. A report record of the charge payment transaction is transmitted from the merchant point of sale to a settlement system and added to an electronic payments report. The transaction log is electronically correlated with the electronic payments report, checking for discrepancies between the transaction log and the electronic payments report. Preferably, the discrepancies include: (i) a transaction record being different from a report record and (ii) a payments report including a report record while a corresponding transaction record is absent from the transaction log and (iii) the transaction log including the transaction record while a corresponding report record is absent in the payments report. Preferably, the method further includes removably connecting the charge payment device to a computer for performing the correlation by the computer. Preferably, the charge payment device forms part of a portable device, the portable device including further a comparator software, and the method further includes loading the comparator software onto the computer for enabling the correlation. Preferably, the charge payment device forms part of a portable device, the portable device also includes (i) a user interface and (ii) a comparator performing the correlation; the method further including displaying a result of the correlation on the user interface. Preferably, wherein the charge payment device forms part of a portable device including a comparator performing the correlation, the method further includes removably connecting the portable device to a computer for displaying by the computer a result of the correlation.

According to the present invention, there is provided a system for verifying a charge payment transaction made at a retail location, the system including: (a) a charge payment device movable into the retail location; (b) a merchant point of sale at the retail location which receives the charge payment device for performing the payment transaction; (c) a log storage device included in said charge payment device for storing a transaction record of the payment transaction in a transaction log; (d) a communication port operatively connectable to a settlement system, for receiving from the settlement system an electronic payments report including a report record of the charge payment transaction; and (e) a comparator for receiving and correlating said transaction log and said electronic payments report thereby checking for at least one discrepancy. Preferably, the discrepancies include: (i) a transaction record being different from a report record, (ii) the payments report including a report record while a corresponding transaction record is absent in the transaction log, and (iii) the transaction log including a transaction record while a corresponding report record is absent in the payments report. Preferably, the comparator forms part of a computer removably connectable to said charge payment device. Preferably, wherein the charge payment device forms part of a portable device, the portable device also includes comparator software for loading onto the computer and enabling the correlation by the comparator. Preferably, wherein the charge payment device forms part of a portable device, the portable device also includes: a comparator to perform the correlation, and a user interface to show results of the correlation Preferably, the charge payment device forms part of a portable device including a comparator for performing the correlating. The system further includes a computer that is removably connectable to the portable device for displaying results of the correlation.

According to the present invention there is provided a portable device for verifying a charge payment transaction, the charge payment transaction performed by the portable device when visiting a merchant point of sale within a retail location, the merchant point of sale connectable to a settlement system for producing an electronic payments report, the portable device comprising: (a) a charge payment device which interfaces with the merchant point of sale, the charge payment device including a payment module to perform the charge payment transaction and a log storage device for recording charge payment transaction details; and (b) a comparator which receives the electronic payments report, retrieves a transaction log from the log storage device, and correlates the electronic payments report with the transaction log to check whether the transaction log and the electronic payments report include a discrepancy.

According to the present invention there is provided a portable device for verifying a charge payment transaction, the charge payment transaction being performed by the portable device when visiting a merchant point of sale within a retail location, the merchant point of sale being operatively connectable to a settlement system for producing an electronic payments report, the portable device being removably connectable to a computer, the portable device including: (a) a charge payment device which interfaces with the merchant point of sale, the charge payment device including a payment module for performing the charge payment transaction, the charge payment device further including a log storage device for recording the charge payment transaction; and (b) a comparator software for being loaded onto the computer and running thereon for: (i) receiving the electronic payments report, (ii) retrieving a transaction log from the log storage device, and (iii) correlating the electronic payments report and the transaction log to check whether the electronic payments report and the transaction log include discrepancies.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for automatically "closing the loop" between payments made by a charge card and the statement report received from the issuer of the charge card. By "charge card" is meant any portable personal device, of any form factor, that uses contact or contactless interface with a compatible merchant reader in a brick and mortar business establishment to charge a respective user account. The system and method for closing the loop is based on automatically storing transaction records in a transaction log and comparing and verifying the transaction records in the transaction log against report records in an electronic payments report, e.g. an electronic monthly statement. The present invention preferably includes a charge payment device, e.g. a charge card, including a mechanism that stores a transaction log of transaction reports, each transaction report including details of a payment transaction made with the charge payment device. Upon receipt of a payments report, i.e. a statement, from the issuing financial institution, the transactions reported in the statement are correlated with the transaction details as stored in the transaction log within the charge payment device. The results of the correlation are typically reported to the cardholder on a display or in printed form. Any discrepancy is immediately and automatically identified, thus only discrepancies require attention of the cardholder while all other transactions have been screened and verified automatically. Optionally, special cases, such as payments of unusually large amounts are also reported to the cardholder. The term "correlation" such as between two lists of records is defined herein as a one-to-one correspondence of the respective records of the two lists. The term "discrepancy" is defined herein to include any difference between the two lists of records, including a missing record from either list and further including any difference in any detail for a particular record. The terms "correlate" and "compare" are used herein interchangeably. The phrase "results of a correlation", "correlation summary" and "results summary" are used herein interchangeably.

The term "financial institution" refers herein to a bank, a credit union, investment broker, or other credit or payment service provider that issues the payment device.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The mechanism for storing transaction details in the charge payment device may be of any such mechanisms known in the art. The terms "storage" and "memory" are used herein interchangeably and refer to any such storage mechanisms.

The present invention may in whole or in part be installed in different variations as part of a portable device, such as a portable digital assistant (PDA), or a cellular telephone or otherwise a portable computer. The term "computer" as defined herein includes a processor, memory, and user interface devices such as a keyboard, mouse and/or a display; all connected and operative in the usual way, and may be in the form of a desktop computer, a portable, i.e. laptop, computer, a notebook computer, a personal digital assistant or a mobile telephone.

The principles and operation of a system and method for automatically storing charge card transaction records and verifying charge card transactions against a monthly statement, according to the present invention, may be better understood with reference to the drawings and the accompanying description.

Figure 2:
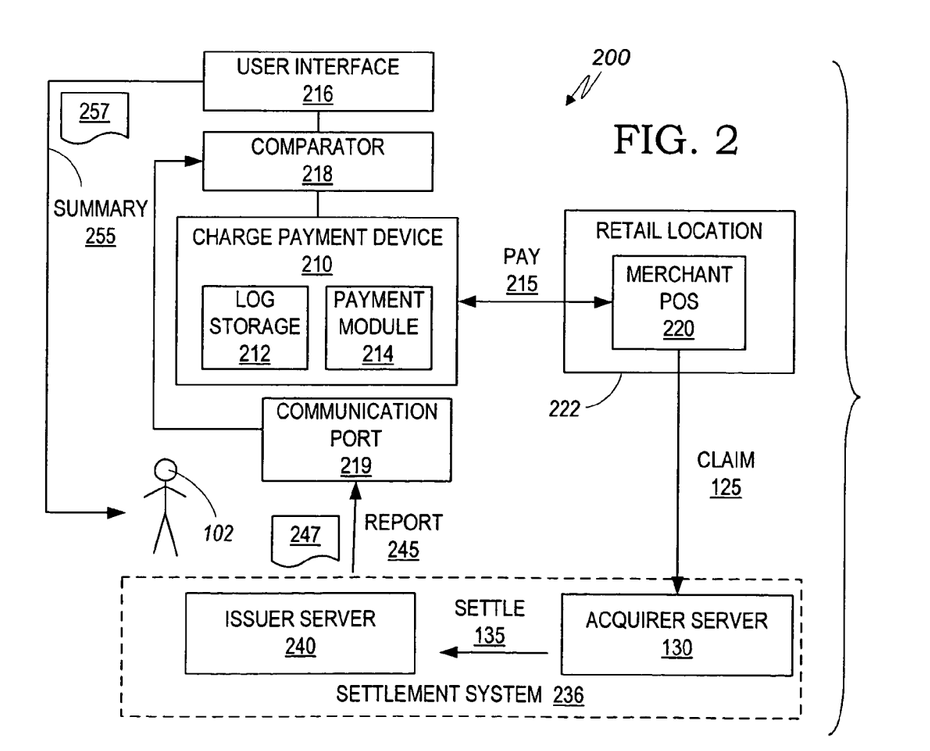
FIG. 2 is a simplified block diagram of a generalized charge payment system in accordance with a preferred embodiment of the present invention.

Reference is now made to FIG. 2, which illustrates a charge payment system 200 according to a preferred embodiment of the present invention. Charge payment device 210 includes a payment module 214 that interfaces with a merchant point-of-sale (POS), being a brick and mortar business establishment, 220 to conduct (step 215) a payment transaction, when submitted by cardholder 102. Payment module 214 provides account details, e.g. name of cardholder, account number, and expiration date. Charge payment device 210 further includes a storage mechanism for log storage 212.

Transaction details for payments conducted with a single charge payment device 210 at different merchants POS 220 at different times, are all logged in log storage 212. Each payment is claimed (step 125) by merchant POS 220 from acquirer server 130. Acquirer server 130 settles (step 135) payment with issuer server 240 of charge payment device 210. Issuer server 240 sends (step 245) a report record 247 regarding each payment transaction settled with the issuer, preferably as a record within an electronic payments report, i.e. monthly statement, or upon cardholder request via an Internet query. Such query options are commercially common and are not described in detail herein. Report record 247 is preferably in electronic form whereas report record 147 of the prior art is optionally printed on paper.

Communication port 219, comparator 218 and user interface 216 are packaged either in the same enclosure with charge payment device 210, or within a separate device, e.g. computer. Communication port 219 receives (step 245) report records 247 from issuer server 240, preferably via a data communications network, e.g. the Internet, and transfers report records 247 to a comparator 218. Comparator 218 is preferably a suitably programmed processor. Comparator 218, correlates transaction records, i.e. the contents of log storage 212, with report records 247, and generates (step 255) a comparison result summary 257 presented to the user 102 through user interface 216, highlighting discrepancies between report records 247 and the transaction records stored in log storage 212. Preferably, comparison result summary 257 is a correlation summary that includes a transaction record without a corresponding report record 247 and/or report record 247 without a corresponding transaction record or report record 247 and a corresponding transaction record with different transaction details. Optionally, comparator 218 includes in results summary 257 also exceptional transactions as previously defined for instance by user 102 through user interface 216. Alternatively, exceptional transactions can be previously defined by the issuer. Exceptional transactions include for instance transactions of amounts over a predetermined threshold or transactions initiated overseas.

The form of the charge payment device 210 is dependent on the payment interface with merchant POS 220. For example, if the payment interface uses a contact smart card protocol, then charge payment device 210 is preferably in the shape of a conventional plastic card; if the payment interface uses contactless technology, then charge payment device 210 is very flexible with respect to its shape, and can be formed as a card, a key fob, or double both as a USB token and contactless device.

Figure 3:
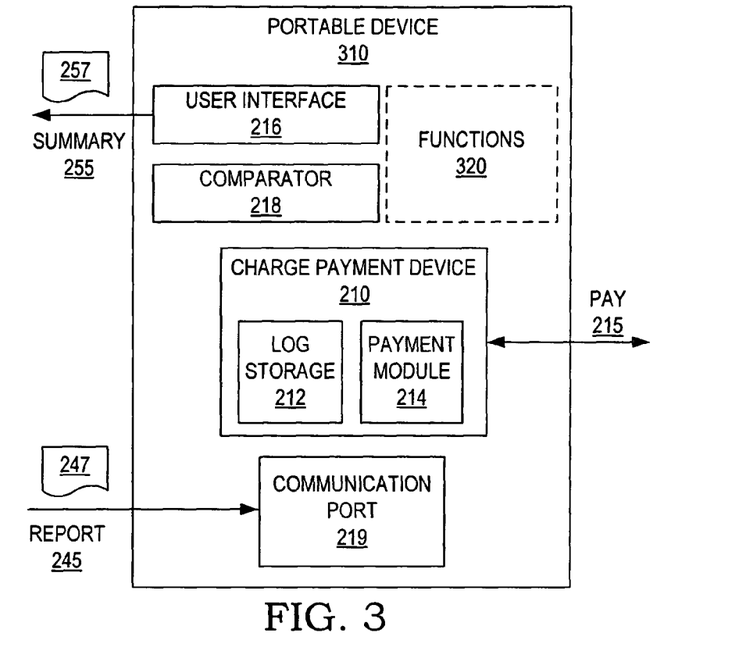
FIG. 3 is a simplified block diagram of a first variation of a charge payment system according to a preferred embodiment of the present invention.

FIG. 3 describes a preferred embodiment of a personal portable device 310, including charge payment device 210, communication port 219, comparator 218 and user interface 216, as hardware and/or software components. Personal portable device 310 is, for instance, included as part of a mobile telephone or a personal digital assistant (PDA). A functions block 320 represents useful hardware, software and corresponding functions such as telephony, MP3 player, voice recorder or storage. Portable device 310 then provides user 102 with an all-in-one capability for payment (step 215), receipt (step 245) of report records 247 and producing (step 255) comparison results summary 257. Portable device 310 is operative as in charge payment system 200 illustrated in FIG. 2.

Figure 4:
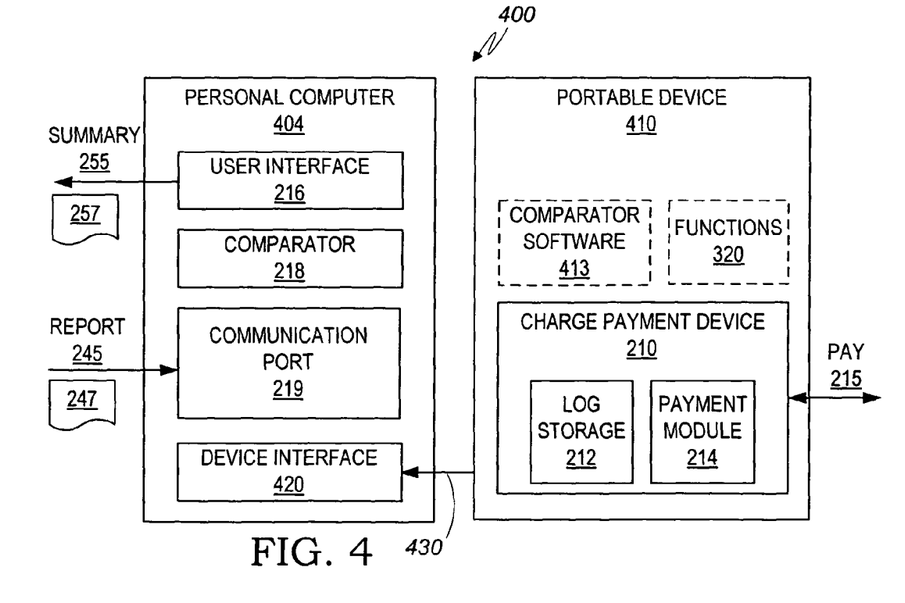
FIG. 4 is a simplified block diagram of a second variation of a charge payment system in accordance with a preferred embodiment of the present invention.

FIG. 4 describes an alternative embodiment of a charge payment system 400 including a portable device 410 and a computer 404. Portable device 410 includes payment module 214, and log storage 212. After purchases are made (step 215) at merchants POS 220 of FIG. 2, using payment module 214, the transaction details are logged in log storage 212. Subsequent to payment (step 215) portable device 410 communicates (step 430) using a communications interface (not shown), e.g. USB serial interface with a device interface 420 of computer 404 and charge payment device 210 sends the transaction records stored in the transaction log, i.e. in log storage 212 to computer 404. Communications (step 430) between portable device 410 and device interface 420 preferably uses the payment interface of payment module 214 or alternatively a different interface, such as a USB interface (not shown). Computer 404 receives (step 245), report records 247 preferably through communications port 219 to a data network, e.g. Internet. Comparator 218 correlates report records 247 with the transaction records from log storage 212 as received during communications (step 430). Comparator 218 is an application previously installed and run on computer 404 to correlate the transaction records of log storage 212 and report records 247, and the comparison results summary 257 is presented (step 255) to user 102 via user interface 216, e.g. display or printer, of computer 404.

According to an embodiment of the present invention, comparator software resides in memory 413 in charge payment device 210 and is loaded onto computer 404 when charge payment device 210 is communicating (step 430). Thus comparator 218 is implemented in computer 404 with software previously stored on portable device 410, allowing the present invention to operate with computer 404 without requiring comparator software previously installed on computer 404.

Figure 5:
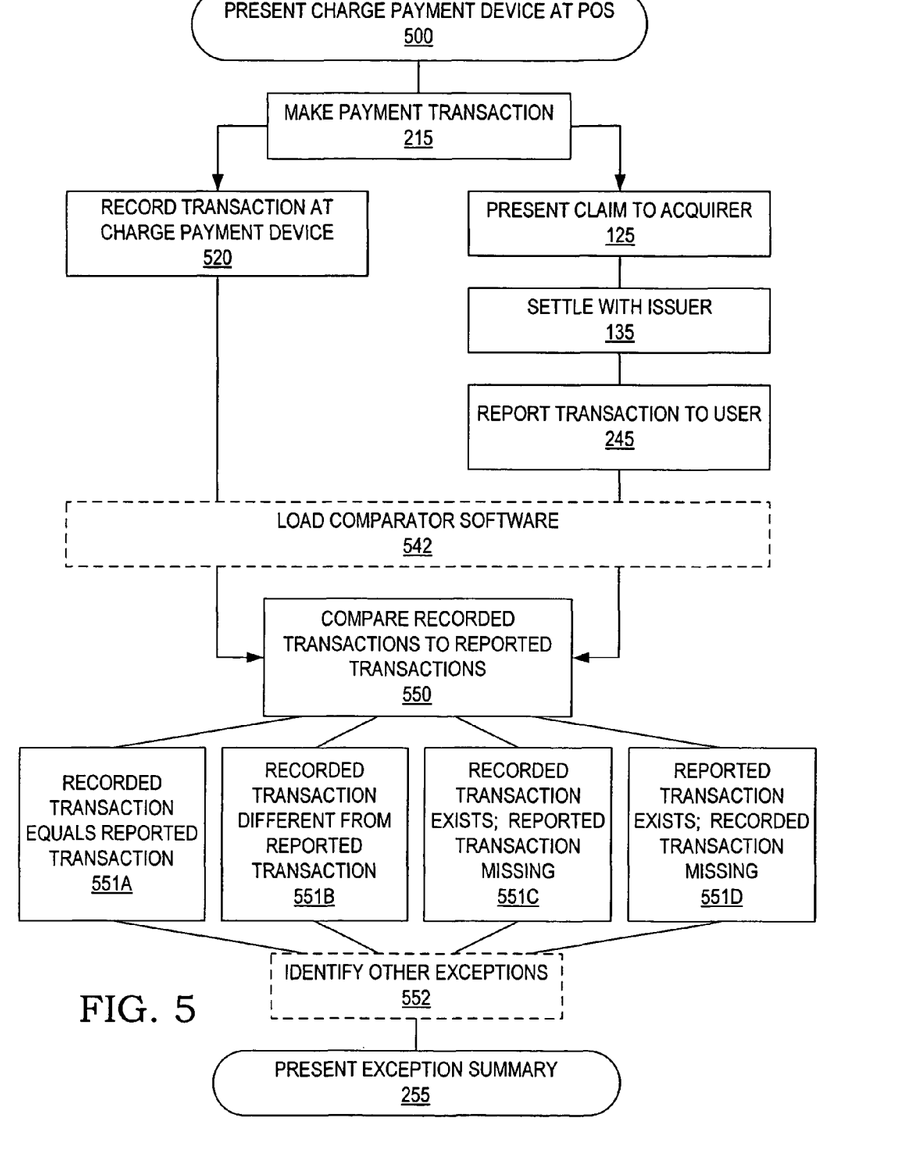
FIG. 5 is a simplified flow chart illustrating the operation of preferred embodiments of the present invention.

FIG. 5 illustrates a method of "closed loop payment" according to embodiments of the present invention. Charge payment device 210 or alternatively portable device 310 or portable device 410 is presented (step 500) for payment at a merchant POS 220 which is a brick and mortar business establishment. Charge payment device 210 or portable device 310/410 communicates (step 215) with merchant point of sale 220 and initiates a payment transaction. Transaction details, e.g. payment amount, merchant identification and transaction date and hour, are logged (step 520) in log storage 212. In parallel, an associated claim is presented (step 125) for instance to acquirer server 130 and subsequently settlement (step 135) is performed for instance with the issuer of charge payment device 210 or portable device 310/410. Alternatively, if a "single server" payment and settlement system is being used, steps 125 and 135 are consolidated into a single step.

User 102 subsequently receives (step 245), preferably electronically an electronic payments report, i.e. a statement including report records 247 of all transactions, e.g. to portable device 310, or for instance, by electronic mail to computer 404. User 102 now has access to two copies that report the payment transactions initiated in step 115: one copy has been logged as the transaction log onto log storage 212 in step 520, and the other copy, the electronic payments record, has been reported to him via the acquirer and issuer in steps 125, 135 and 245.

In optional step 542, operable in portable device 410, of charge payment system 400, a comparator software module is loaded onto computer 404, from comparator software in memory 413, for implementing comparator 218. Comparator 218 compares (step 550) transaction records in the transaction log of log storage 212 with report records 247, the result of the comparison may be: (block 551A) the transaction record equals report record 247, (block 551B) the transaction record is different from report record 247, (block 551C) the transaction record exists in the transaction log but does not exist in the payments report, or that (block 551D) report record 247 exists in the payments report but a corresponding record does not exist in the transaction log. A comparison result summary 257 is generated by comparator 218 and presented (step 255) to user 102, highlighting discrepancies between report records 247 as reported in the electronic payments report and the transaction records as reported in the transaction log. In optional step 552, other previously defined exceptions, e.g. transactions of high amount or transactions made overseas are identified. All exceptions, i.e. discrepancies identified in step 550 and other exceptions identified in step 552, are presented (step 255) in the comparison result summary 257.

Figure 4A:
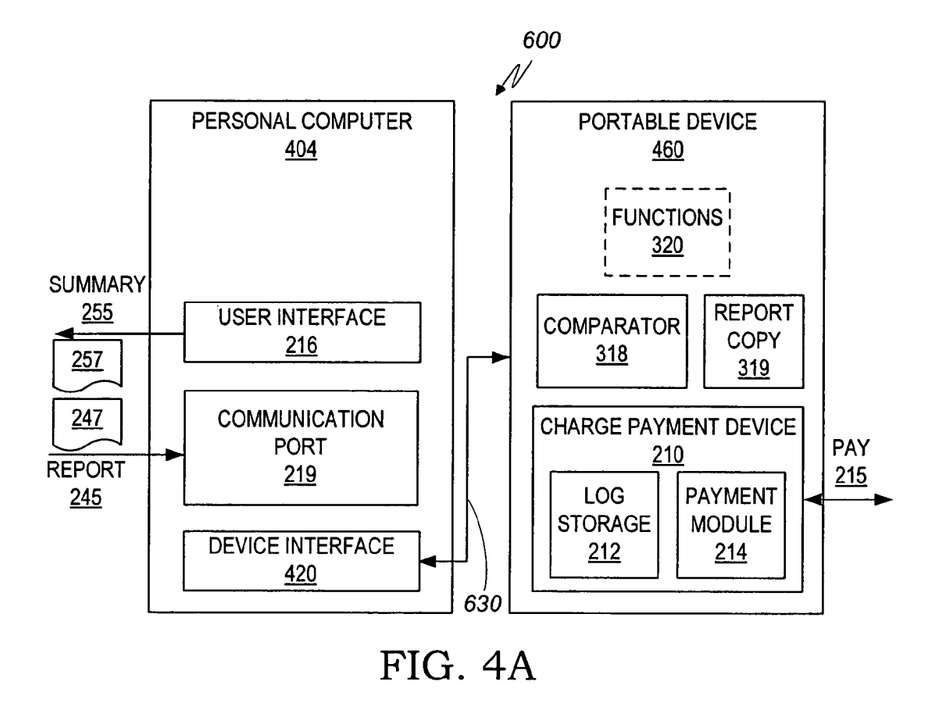
FIG. 4A is a simplified block diagram of a third variation of a charge payment system in accordance with a preferred embodiment of the present invention.
Figure 5A:
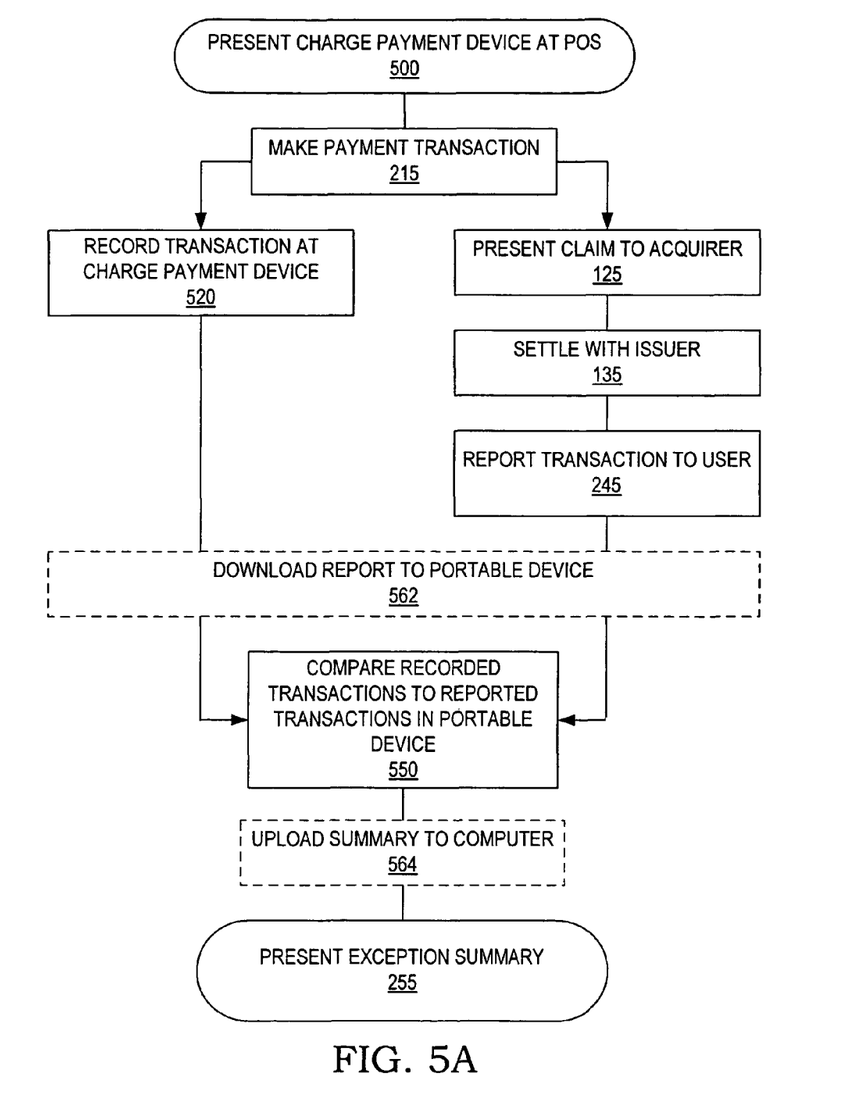
FIG. 5A is a simplified flow chart illustrating the operation of the third variation of the present invention.

Referring to FIG. 4A, according to an embodiment 600 of the present invention, a portable device 460 includes for instance a processor that is programmed to run as comparator 318. Reference is also made to FIG. 5A, a procedure according 10 to the present invention appropriate for embodiment 600. As in the embodiments of FIG. 5, user 102 presents portable device 460 to merchant POS 220. The transaction is recorded 520 on portable device 460 in log storage 212. In parallel, the claim is presented (step 125) to acquirer server 130, settled (step 135) with issuer server 240 and the transaction is reported (step 245) to user 102. However, unlike the embodiments of FIG. 5, user 102 with user interface 216 loads (step 562) report 247 through communications interface 630, e.g. USB serial interface, into report copy file storage 319 of portable device 460. The copy of report 247 is stored in report copy file storage 319 under a reserved file name, e.g. "transaction—report.txt". Comparator 318 identifies the presence of an updated copy of report 247 stored in storage 319, and correlates (step 550) on board device 460 the contents of log storage 212 with the contents, e.g. "transaction—report.txt", of report copy storage 319. The correlation results, i.e. discrepancies and other exceptions are stored in storage on portable device 460, for instance in storage 319 overwriting file transaction—report.txt. The correlation results are read (step 564) by computer 404 through device interface 420 and communications interface 630; and presented (step 255) through user interface 216 as comparison result summary 257.

The advantage of embodiment 600 and the method of FIG. 5A arises from security issues associated with loading software applications onto computers 404 from external devices. Many computers 404 are configured to block the loading of applications from external storage devices. Embodiment 600 of FIG. 4A and the method of FIG. 5A include transfer of data only, i.e. text files, and do not include transfer of executable code.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

What is claimed is:

1. A method of verifying a charge payment transaction, the method comprising:
performing a charge payment transaction via a portable device;
storing a transaction record associated with the charge payment transaction in a transaction log, the transaction log stored in a flash memory device included in the portable device; and
comparing the transaction log with one or more report records of an electronic payments report received from a settlement system to detect one of:
a discrepancy between the transaction log and the electronic payments report, wherein the discrepancy is detected when the transaction log includes a particular transaction record and a corresponding report record is absent from the electronic payments report; and an exceptional transaction, wherein the exceptional transaction is associated with at least one of:
 a user-defined exception that is defined by the user of the portable device; and
 an issuer-defined exception that is defined by an issuer of the electronic payments report.

2. The method of claim 1, wherein the electronic payments report is received from a server that is external to the portable device.

3. The method of claim 1, wherein the flash memory device further stores comparator software, the method further comprising loading the comparator software onto a computer that is external to the portable device and performing the comparison at the computer.

4. The method of claim 1, wherein the portable device includes a comparator to perform the comparison.

5. The method of claim 1, further comprising removably connecting the portable device to a computer that is external to the portable device to display a comparison result summary at a display.

6. The method of claim 1, wherein the user-defined exception is associated with one of:
 an amount associated with the charge payment transaction that exceeds a predetermined threshold; and
 the charge payment transaction being initiated in a different country, wherein the different country differs from a country associated with the user of the portable device.

7. The method of claim 1, wherein the issuer-defined exception is associated with one of:
 an amount associated with the charge payment transaction that exceeds a predetermined threshold; and
 the charge payment transaction being initiated in a different country, wherein the different country differs from a country associated with the user of the portable device.

8. The method of claim 1, further comprising generating a comparison result summary based on the comparison and displaying the comparison result summary on a user interface of the portable device.

9. The method of claim 1, further comprising receiving the electronic payments report at the portable device via an internet data network.

10. A system to verify a charge payment transaction, the system comprising:
 a charge payment device that is included in a portable device, the charge payment device to originate a charge payment transaction;
 a flash memory storage device within the portable device, the flash memory storage device to store a charge transaction record in a transaction log at the flash memory storage device, wherein the charge transaction record is associated with the charge payment transaction;
 a communication port operatively connectable to a settlement system, the communication port to receive from the settlement system an electronic payments report including a report record associated with the charge payment transaction; and
 a comparator to detect one of:
  a discrepancy that is detected when the transaction log includes a particular transaction record and a corresponding report record is absent from the electronic payments report; and
  an exceptional transaction, wherein the exceptional transaction is associated with at least one of:
   a user-defined exception that is defined by a user of the portable device; and
   an issuer-defined exception that is defined by an issuer of the electronic payments report.

11. The system of claim 10, wherein the comparator forms part of a computer that is removably connectable to the charge payment device.

12. The system of claim 10, wherein the portable device includes a display configured to display an output of the comparator.

13. The system of claim 10, wherein the user-defined exception is associated with one of:
 an amount associated with the charge payment transaction that exceeds a predetermined threshold; and
 the charge payment transaction being initiated in a different country, wherein the different country differs from a country associated with the user of the portable device.

14. The system of claim 10, wherein the issuer-defined exception is associated with one of:
 an amount associated with the charge payment transaction that exceeds a predetermined threshold; and
 the charge payment transaction being initiated in a different country, wherein the different country differs from a country associated with the user of the portable device.

15. A method comprising:
 in a data storage device with a memory and a communication interface, performing, while the data storage device is operatively coupled to a host device:
  storing a transaction record at a transaction log within the memory, the transaction record associated with a charge payment transaction completed by a portable device that includes the memory; and
  provide providing, via the communication interface, the transaction log to a comparator that is configured to perform a comparison of the transaction log with an electronic payments report received from a settlement system to detect one of:
   a discrepancy that is detected when the transaction log includes a particular transaction record and a corresponding report record is absent from the electronic payments report; and
   an exceptional transaction, wherein the exceptional transaction is associated with one of:
    a user-defined exception that is defined by a user of the portable device; and
    an issuer-defined exception that is defined by an issuer of the electronic payments report.

16. The method of claim 15, wherein the portable device includes a communication port to receive the electronic payments report via an internet data network.

17. The method of claim 15, wherein the comparator forms part of the host device, wherein the host device is removably connectable to the portable device.

18. The method of claim 15, wherein the memory further stores comparator software including instructions executable by the comparator to perform the comparison.

19. The method of claim 15, wherein the memory is a flash memory device.

20. The method of claim 15, wherein the user-defined exception is associated with one of:

an amount associated with the charge payment transaction that exceeds a predetermined threshold; and the charge payment transaction being initiated in a different country, wherein the different country differs from a country associated with the user of the portable device.

21. The method of claim 15, wherein the issuer-defined exception is associated with one of:

an amount associated with the charge payment transaction that exceeds a predetermined threshold; and the charge payment transaction being initiated in a different country, wherein the different country differs from a country associated with the user of the portable device.

\* \* \* \* \*

UNITED STATES PATENT AND TRADEMARK OFFICE
CERTIFICATE OF CORRECTION

| | | |
|---|---|---|
| PATENT NO. | : 8,249,988 B2 | Page 1 of 1 |
| APPLICATION NO. | : 10/989330 | |
| DATED | : August 21, 2012 | |
| INVENTOR(S) | : Mordechai Teicher | |

It is certified that error appears in the above-identified patent and that said Letters Patent is hereby corrected as shown below:

In the Claims section, Column 10, Claim 15, Line 45, "provide providing, via the communication interface, the" should read --providing, via the communication interface, the--.

Signed and Sealed this
Fourteenth Day of May, 2013

Teresa Stanek Rea
*Acting Director of the United States Patent and Trademark Office*